(12) United States Patent
Lieberman et al.

(10) Patent No.: US 10,534,796 B1
(45) Date of Patent: Jan. 14, 2020

(54) MAINTAINING AN ACTIVE-ACTIVE CLOUD ACROSS DIFFERENT TYPES OF CLOUD STORAGE SERVICES

(71) Applicant: EMC IP Holding Company LLC, Hopkinton, MA (US)

(72) Inventors: Amit Lieberman, Raanana (IL); Jehuda Shemer, Kfar Saba (IL); Assaf Natanzon, Tel Aviv (IL); Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 486 days.

(21) Appl. No.: 15/198,280

(22) Filed: Jun. 30, 2016

(51) Int. Cl.
*G06F 16/27* (2019.01)
*G06F 16/25* (2019.01)
*G06F 16/23* (2019.01)
*H04L 29/08* (2006.01)

(52) U.S. Cl.
CPC ........ *G06F 16/275* (2019.01); *G06F 16/2365* (2019.01); *G06F 16/252* (2019.01); *G06F 16/254* (2019.01); *G06F 16/258* (2019.01); *H04L 67/1095* (2013.01)

(58) Field of Classification Search
None
See application file for complete search history.

(56) References Cited

U.S. PATENT DOCUMENTS

| | | | |
|---|---|---|---|
| 8,429,362 B1* | 4/2013 | Natanzon | G06F 11/1471 711/161 |
| 9,384,202 B1* | 7/2016 | Tang | G06F 17/3056 |
| 2003/0033317 A1* | 2/2003 | Ziglin | G06F 17/30557 |
| 2006/0106878 A1* | 5/2006 | Shitomi | G06F 17/30067 |
| 2010/0199109 A1* | 8/2010 | Terek | G06F 3/0608 713/194 |
| 2011/0022601 A1* | 1/2011 | Elrom | G06F 17/30067 707/747 |
| 2015/0261782 A1* | 9/2015 | McFerrin | G06F 16/178 707/625 |
| 2016/0171245 A1* | 6/2016 | Bura | G06F 21/64 726/17 |

* cited by examiner

*Primary Examiner* — James Trujillo
*Assistant Examiner* — John J Morris
(74) *Attorney, Agent, or Firm* — Staniford Tomita LLP

(57) ABSTRACT

A first cloud is provided with a first abstraction layer between a first instance of an application and a first set of different storage types. A second cloud, remote from the first cloud, is provided with a second abstraction layer between a second instance of the application and a second set of different storage types. A replication protection appliance (RPA) is connected between the first and second abstraction layers. The first abstraction layer intercepts a write command from the first instance of the application to storage of a particular type among the first set of different storage types. The first abstraction layer sends a copy of the write command to the RPA. The RPA replicates the write command to the second abstraction layer for the second abstraction layer to send to corresponding storage of the particular type among the second set of different storage types.

14 Claims, 10 Drawing Sheets

| Write Number | Write | Storage Type | Data Set |
|---|---|---|---|
| 1 | Write A | File Store | marketing_plan.doc |
| 2 | Write B | File Store | marketing_plan.doc |
| 3 | Write AA | Object Store | objectID_x |
| 4 | Write BB | Object Store | objectID_x |

FIG. 10

MAINTAINING AN ACTIVE-ACTIVE CLOUD ACROSS DIFFERENT TYPES OF CLOUD STORAGE SERVICES

RELATED APPLICATIONS

This application is related to U.S. patent application Ser. Nos. 14/984,279; 14/984,265; and 14/984,301, all filed Dec. 30, 2015, which are incorporated by reference along with all other references cited herein.

TECHNICAL FIELD

Embodiments are generally directed to networked-based data protection methods, and more specifically to an active-active cloud computing architecture.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

"Cloud computing" refers to the use of remotely hosted resources to provide services to customers over one or more networks such as the Internet. Resources made available to customers are typically virtualized and dynamically scalable. Cloud computing services may include providing applications, application services, storage, storage services, data protection services, and so forth. Cloud computing services may be provided to customers through client software such as a Web browser (e.g., Google Chrome, Microsoft Internet Explorer, Microsoft Edge, or Apple Safari).

The software and data used to support cloud computing services may be located on remote servers owned by a cloud computing service provider. In some cases, customers consuming services offered through a cloud computing platform do not own the physical infrastructure hosting the actual service, and may accordingly avoid capital expenditure on hardware systems by paying only for the service resources they use, a subscription fee, or both. In other cases, customers may own and operate their own cloud computing network, but may have a desire to access another cloud computing network (e.g., public cloud) for additional resources such as in a hybrid cloud configuration.

From a service provider's standpoint, the sharing of computing resources across multiple customers or "tenants" improves resource utilization. Use of the cloud computing service model has been growing due to the increasing availability of high bandwidth communication, making it possible to obtain response times from remotely hosted cloud-based services similar to those of services that are locally hosted.

The growth in cloud computing has been accompanied by a growth in the number of different storage services that are available. Such storage services may include file stores, databases, and object stores, among others. Some storage may be better suited than other storage depending upon factors such as the type of data to be stored, budget, needs, and so forth. Regardless of what storage type a customer chooses, it can be desirable to provide redundancy. For example, it may be desirable to have two simultaneous instances of a business critical application running in two different locations. This allows the business to continue operations uninterrupted even if one of the locations should fail. However, because of the different types of storage services available, there is a need for improved systems and techniques to ensure replication of the same storage type across cloud computing sites.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 10 shows an example of a map maintained by the RPA to handle multiple writes during an asynchronous write mode according to an embodiment.

INCORPORATION BY REFERENCE

Figure 1:
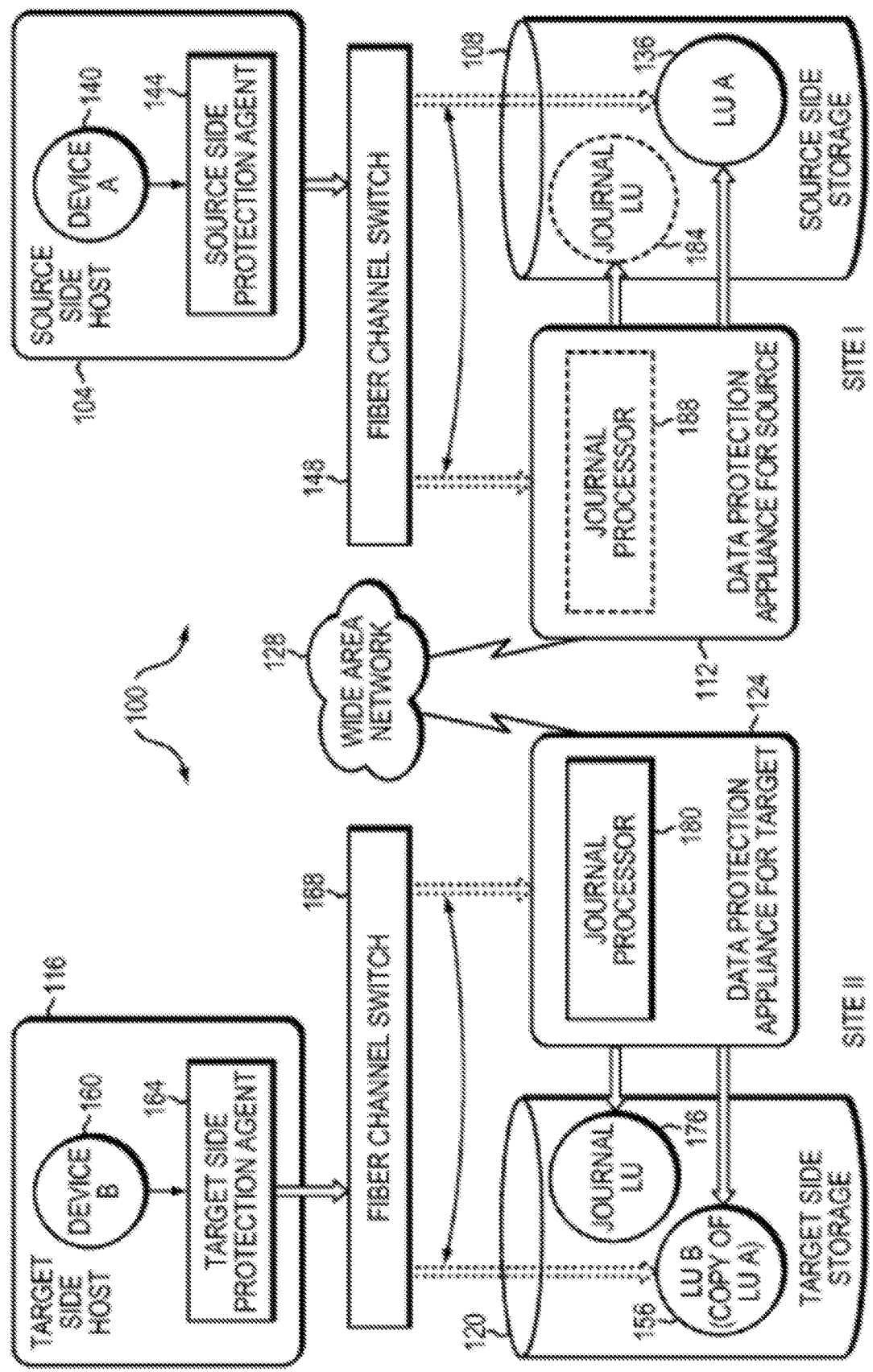
FIG. 1 is a simplified illustration of a data protection system, under some embodiments.

Each publication, patent, and/or patent application mentioned in this specification, including U.S. patent applications Ser. No. 14/984,279, filed Dec. 30, 2015; Ser. No. 14/984,265, filed Dec. 30, 2015, Ser. No. 14/984,301, filed Dec. 30, 2015; U.S. Pat. No. 7,516,287, filed Sep. 28, 2006, issued Apr. 7, 2009; U.S. Pat. No. 8,332,687, filed Jun. 23, 2010, issued Dec. 11, 2012; U.S. Pat. No. 8,341,115, filed Dec. 26, 2009, issued Dec. 25, 2012; and U.S. Pat. No. 8,725,691, filed Dec. 16, 2010, issued May 13, 2014, are herein incorporated by reference in their entirety.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer (e.g., processor of the computer), the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for facilitating an active-active cloud computing architecture that can be used as part of a disaster recovery solution for large-scale networks. Some embodiments of the invention involve automated backup and recovery techniques in a distributed system, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

For purposes of the following description, the following terms have the associated definitions:

Backup Site—may be a facility where replicated production site data is stored; the backup site may be located in a remote site or at the same location as the production site; a backup site may be a virtual or physical site; a backup site may be referred to alternatively as a replica site or a replication site.

Clone—a clone may be a copy or clone of the image or images, drive or drives of a first location at a second location.

Delta Marking Stream—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

Host—may be at least one computer or networks of computers that runs at least one data processing application that issues I/O requests to one or more storage systems; a host is an initiator with a SAN; a host may be a virtual machine.

Host Device—may be an internal interface in a host, to a logical storage unit.

Image—may be a copy of a logical storage unit at a specific point in time.

Initiator—may be a node in a SAN that issues I/O requests.

Journal—may be a record of write transactions issued to a storage system; used to maintain a duplicate storage system, and to rollback the duplicate storage system to a previous point in time.

Logical Unit—may be a logical entity provided by a storage system for accessing data from the storage system.

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and Deployment Tools—may provide the means to deploy, control and manage the RPA solution through the virtual environment management tools.

Physical Storage Unit—may be a physical entity, such as a disk or an array of disks, for storing data in storage locations that can be accessed by address.

Production Site—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target.

Source Side—may be a transmitter of data within a data replication workflow, during normal operation a production site is the source side; and during data recovery a backup site is the source side; may be a virtual or physical site.

Snapshot—a Snapshot may refer to differential representations of an image, i.e. the snapshot may have pointers to the original volume, and may point to log volumes for changed locations. Snapshots may be combined into a snapshot array, which may represent different images over a time period.

Storage System—may be a SAN entity that provides multiple logical units for access by multiple SAN initiators.

Target—may be a node in a SAN that replies to I/O requests.

Target Side—may be a receiver of data within a data replication workflow; during normal operation a back site is the target side, and during data recovery a production site is the target side; may be a virtual or physical site.

WAN—may be a wide area network that connects local networks and enables them to communicate with one another, such as the Internet.

Splitter/Protection Agent—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

Virtual Volume—may be a volume which is exposed to a host by a virtualization layer, the virtual volume may be spanned across more than one site, volumes, or both.

VASA—may be a set of vCenter providers that allow an administrator to manage storage.

VMFS—may be a virtual machine file system, a file system provided by VMware for storing a virtual machine.

VMDK—may be a virtual machine disk file containing a disk data in a VMFS. A VMDK may be analogous to a LUN in a block storage array.

Virtual RPA (vRPA)/Virtual DPA (vDPA)—may be a DPA running in a VM.

VASA—may be vSphere Storage application program interfaces (APIs) for storage awareness.

Marking on Splitter—may be a mode in a splitter where intercepted IOs are not split to an appliance and the storage, but changes (meta data) are tracked in a list and/or a bitmap and I/O is immediately sent to down the IO stack.

Fail All Mode—may be a mode of a volume in the splitter where all write and read IOs intercepted by the splitter are failed to the host, but other SCSI commands like read capacity are served.

Logged Access—may be an access method provided by the appliance and the splitter, in which the appliance rolls the volumes of the consistency group to the point in time the user requested and let the host access the volumes in a copy on first write base.

Virtual Access—may be an access method provided by the appliance and the splitter, in which the appliance exposes a virtual volume from a specific point in time to the host, the data for the virtual volume is partially stored on the remote copy and partially stored on the journal.

CDP—Continuous Data Protection, may refer to a full replica of a volume or a set of volumes along with a journal which allows any point in time access, the CDP copy is at the same site, and maybe the same storage array of the production site.

CRR—Continuous Remote Replica may refer to a full replica of a volume or a set of volumes along with a journal which allows any point in time access at a site remote to the production volume and on a separate storage array.

A description of journaling and some techniques associated with journaling may be described in U.S. Pat. No. 7,516,287, filed Sep. 28, 2006, issued Apr. 7, 2009, entitled "Methods and Apparatus for Optimal Journaling for Continuous Data Replication," and U.S. Pat. No. 8,332,687, filed Jun. 23, 2010, issued Dec. 11, 2012, entitled "Splitter Used In A Continuous Data Protection Environment." A description of synchronous and asynchronous replication may be described in U.S. Pat. No. 8,341,115, filed Dec. 26, 2009, issued Dec. 25, 2012, entitled "Dynamically Switching Between Synchronous and Asynchronous Replication." A discussion of image access may be found in U.S. Pat. No. 8,725,691, filed Dec. 16, 2010, issued May 13, 2014, entitled "Dynamic LUN Resizing In A Replication Environment." These patents are assigned to EMC Corporation of Hopkinton, Mass., and are incorporated by reference.

A description of embodiments using a five state journaling process follows. Reference is now made to FIG. 1, which is a simplified illustration of a data protection system 100, in accordance with one embodiment. Shown in FIG. 1 are two sites: Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier point time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover." A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use. In accordance with an embodiment, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes." A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links. In an embodiment, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment, storage system 108 exposes a logical unit 136, designated as LU A, and storage system 120 exposes a logical unit 156, designated as LU B.

In an embodiment, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned above, some logical units of storage system 120 may be used to back up logical units of storage system 108, and other logical units of storage system 120 may be used for other purposes. Moreover, in certain embodiments, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment, host device 104 identifies LU A and generates a corresponding host device 140, designated as Device A, through which it can access LU A. Similarly, host computer 116 identifies LU B and generates a corresponding device 160, designated as Device B.

In an embodiment, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional central processing units (CPUs) and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP-based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described above, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA. Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment, protection agents communicate with their respective DPAs by sending SCSI commands over fiber channel.

In an embodiment, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode. In accordance with an embodiment, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction," over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A. In asynchronous mode, DPA 112 sends an acknowledgement to protection agent 144 upon receipt of each I/O request, before receiving an acknowledgement back from DPA 124. In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity. While in production mode, DPA 124 receives replicated data of LU A from DPA 112, and performs journaling and writing to storage system 120. When applying write operations to storage system 120, DPA 124 acts as an initiator, and sends SCSI commands to LU B. During a recovery mode, DPA 124 undoes the write transactions in the journal, so as to restore storage system 120 to the state it was at, at an earlier time.

As described above, in accordance with an embodiment, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment, target storage system 120 exposes a logical unit 176, referred to as a "journal LU," for maintaining a history of write transactions made to LU B, referred to as a "journal." Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already applied transactions from the journal. In one embodiment, journal entries include four streams, two of which are written when write transaction are entered into the journal, and two of which are written when write transaction are applied and removed from the journal.

Figure 2:
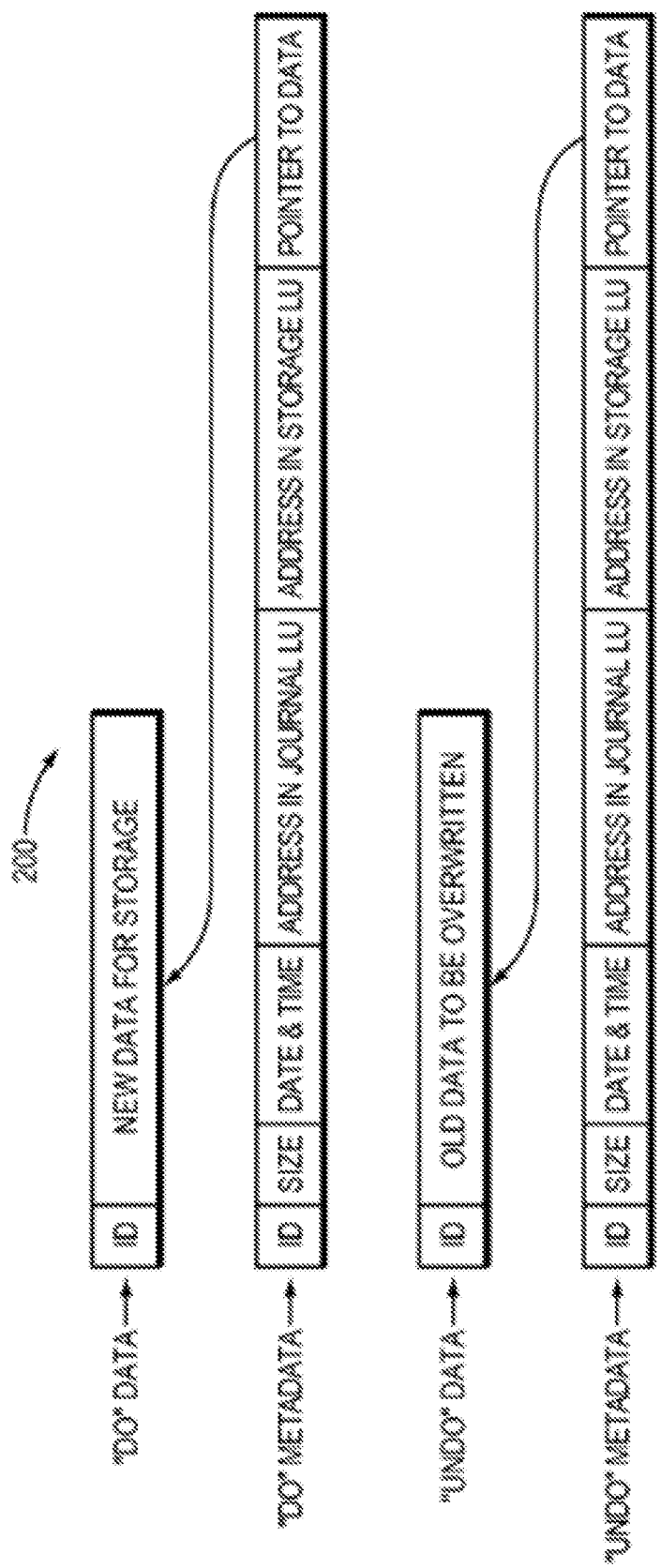
FIG. 2 is a simplified illustration of a write transaction for a journal, under some embodiments.

Reference is now made to FIG. 2, which is a simplified illustration of a write transaction 200 for a journal, in accordance with an embodiment. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described above. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Figure 3:
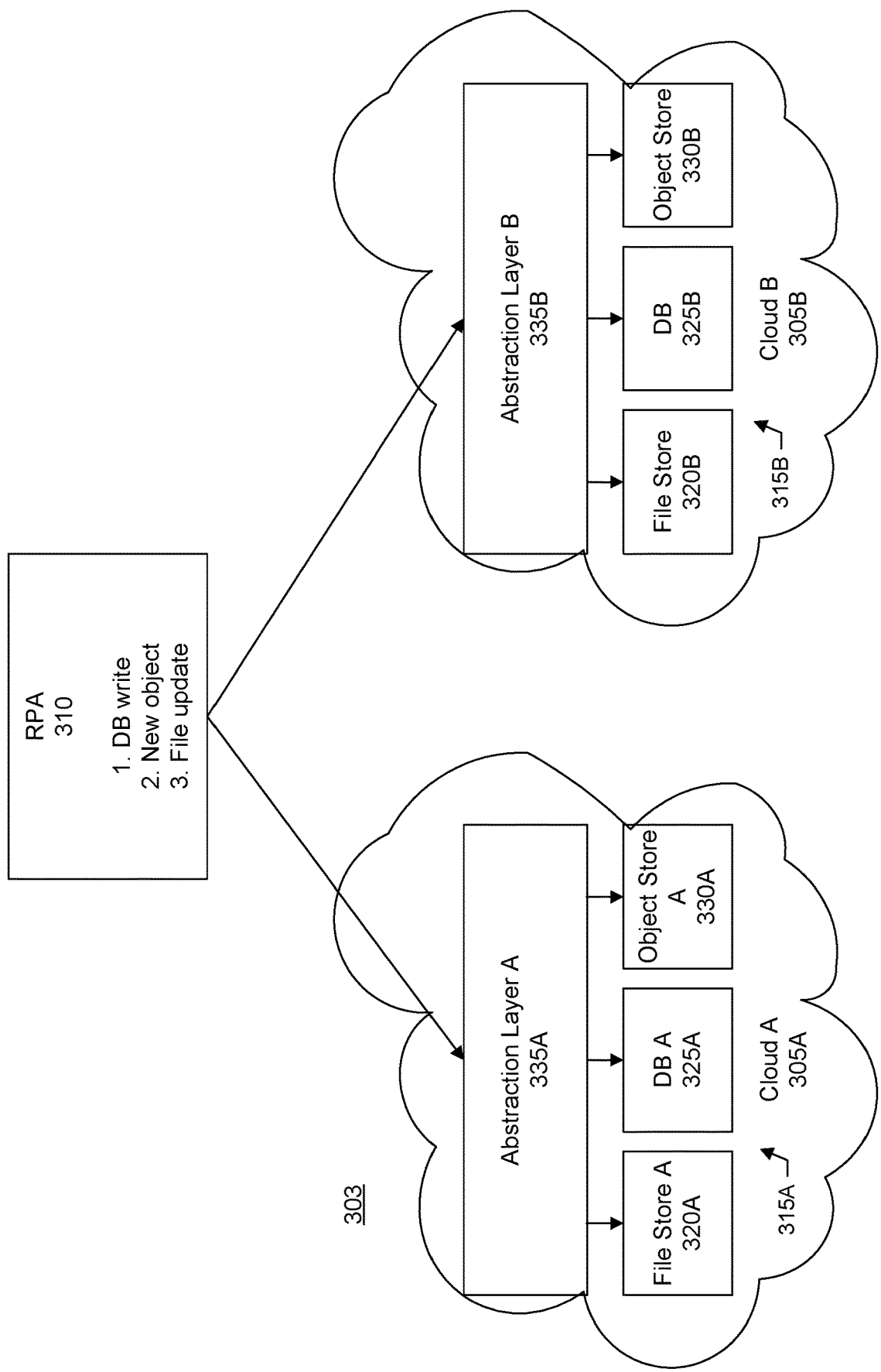
FIG. 3 shows a block diagram of an active-active cloud computing configuration according to a specific embodiment.

FIG. 3 shows a simplified block diagram of an active-active cloud computing architecture or system 303 according to a specific embodiment. In this specific embodiment, there is a first cloud A 305A, a second cloud 305B, and a replication protection appliance (RPA) 310 connected between the two clouds. First cloud A includes a first set 315A of different persistent storage services or types of storage including a first file store A 320A, a first database A 325A, and a first object store A 330A. The first cloud further includes a first abstraction layer A 335A over the first set of different storage types.

Similarly, second cloud B includes a second set 315B of different persistent storage services or types of storage including a second file store B 320B, a second database B 325B, and a second object store B 330B. The second cloud further includes a second abstraction layer B 335B over the second set of different storage types.

In this specific embodiment, the RPA facilitates an active-active cloud computing architecture to help ensure continuous availability or uptime. For example, a fault at one of the first or second cloud locations will not affect the ability of an application hosted by the active-active cloud system to perform at another of the first or second cloud locations because the active-active configuration provides replication and redundancy. The RPA connects to each of the first and second abstraction layers to help maintain data consistency between a storage type in one of the first or second clouds and a corresponding storage type in another of the first or second clouds.

In a specific embodiment, the abstraction layer is built over persistent storage services (e.g., block, object store, file system, databases, key value pairs, and so forth). This layer facilitates techniques to provide value added storage services such as backup and replication. There can be a splitter which operates not only with block storage, but also with any kind of persistent storage, and also combinations of different storage types. For example, you can achieve a consistent point-in-time (PiT) between five block volumes, a file system, three databases, and an object store. This is of special interest with cloud services because it allows creating a consistent snapshot across multiple services and even multiple clouds. In a specific embodiment, the method in which a consistent PiT is achieved is by keeping a recover point appliance that can receive write requests from multiple sources (DB, object store, and so forth) and number them according to their arrival time.

In a specific embodiment, active-active support is provided using the abstraction layer and the consistent PiT techniques. Active-Active refers to a computing architecture in which multiple instances of the application will run in parallel, over the same or different cloud providers, possibly in different geographical locations. Those instances will be able to perform writes (as well as reads) and will still keep the data consistent using the RPA. Below are some benefits of an active-active cloud.

1) Even in a case of one cloud failing traffic will be picked up by the other cloud seamlessly.

2) By running active-active at all times with transactions going to both clouds you have high confidence that the switchover will be successful versus an active-passive model (or even worse, a disaster recovery model) where it can be difficult to predict the exact outcome.

3) The active-active approach better utilizes existing resources, allowing improved performance as compared to the active-passive approach.

4) The active-active cloud prevents a cloud lock in, at any time, you have your application running in several different cloud provides, so at any given time, you can disconnect from one and stay with another (possibly increasing resources, if needed).

In some embodiments, any data that goes through the abstraction layer is intercepted and a copy of the data is sent to the RPA. The RPA numbers the data packets as they arrive regardless of their origin. This numbering helps to maintain write-order fidelity between all sources. After the data is numbered the RPA acknowledges the packet to the abstraction layer, which then forwards the packet to the original destination.

In an active-active architecture, however, there are at least two sources, each writing to one of two specific data sources. In the active-active architecture, there are multiple instances of the abstraction layer each running on or at a separate location in order to service multiple sources of the application. In a specific embodiment, for every write, when data is sent to the RPA it is not numbered automatically, but rather the RPA validates that indeed this write is possible and if so, sends an acknowledgement to the source of the write.

There can be synchronous writes or asynchronous writes. In a synchronous write mode, in order for a write to occur, the RPA sends the write to all the different abstraction layers and receives acknowledgements from each of the different abstraction layers. Only once the acknowledgements are received will the RPA send an acknowledgement again to the source cloud. Table A below shows a flow for a synchronous write process.

TABLE A

| Step | Description |
|---|---|
| 1 | Data source in cloud A sends a write command |
| 2 | RPA sends the write to all other clouds forming the active/active environment (e.g., cloud B) |
| 3 | Cloud B sends an acknowledgment back to the RPA |
| 4 | RPA sends acknowledgement back to cloud A |

Consider, as an example, if cloud B does a write to the same data set between step 1 and step 3. In this case, before cloud B receives the original command cloud B will receive a notification that data set was changed and according to that will try to do its write again. In addition, in order not to miss writes, each write notification will be numbered so that it will be sequential. Each cloud will only handle a write having the next sequence number.

Table B below lists some errors or scenarios that may occur in any given step and how those scenarios are handled.

TABLE B

| Scenario | Outcome |
|---|---|
| Scenario 1: RPA did not receive the packet. | Cloud A will try again, or revert the write. |
| Scenario 2: Cloud B did not receive any packet from RPA. | RPA will resend until it receives acknowledgment. RPA will eventually mark cloud B as inaccessible and still send proper acknowledgement to cloud A, which will force cloud B later on to synch to cloud A once it goes online again. |
| Scenario 3: Cloud B sends acknowledgement back to RPA, RPA does not receive. | For the RPA, this is the same as scenario number 2. |
| Scenario 4: RPA sent acknowledgement, cloud A does not receive, | Cloud A will resend the write (just like scenario 1) and if still no acknowledgement arrives, it will assume no connection to RPA exists and will stop all writes until a connection is established and full synchronization occurs |

Synchronous writes, however, can significantly slow down writes especially during periods of high network activity, large geographical distances or separations between the cloud site locations, or other factors. Thus, in some cases, the RPA may be configured for asynchronous writes. Asynchronous writes may be referred to as eventual consistency. Eventual consistency is a consistency model used in distributed computing to achieve high availability that informally guarantees that, if no new updates are made to a given data item, eventually all accesses to that item will return the last updated value.

In the asynchronous mode of operation, it will be sufficient to send a write request to the RPA and receive an acknowledgement from it. The RPA will send the writes to all the other cloud nodes. In an embodiment, the RPA includes logic to apply asynchronous write capability. In this specific embodiment, the RPA keeps or maintains a log of all the write commands, as described before. For each such write activity, the RPA also keeps or maintains the status of the command in regards to the other servers, whether they acknowledge that write command or not.

Table C below shows a flow for an asynchronous write procedure.

TABLE C

| Step | Description |
|---|---|
| 1 | Cloud A sends a write command to RPA |
| 2 | RPA adds it to the log and marks it as not confirmed with cloud B |
| 3 | RPA sends acknowledgment to cloud A |
| 4 | In parallel RPA sends the command to cloud B |
| 5 | Cloud B sends a notification |

Consider, as an example, if cloud B sends a write after cloud A sent its write. Write A (from cloud A) will be numbered. Write B (from cloud B) will be numbered with a higher number. RPA will identify that the write occurs on the same data set. In other words, the RPA will keep or maintain a map to all data set basic structures being in a process of writes at that moment, such as object, DB table, document, and so forth. This data will be stored until all writes are confirmed. The RPA will send write B only once write A was sent and acknowledged to all nodes.

Figure 4:
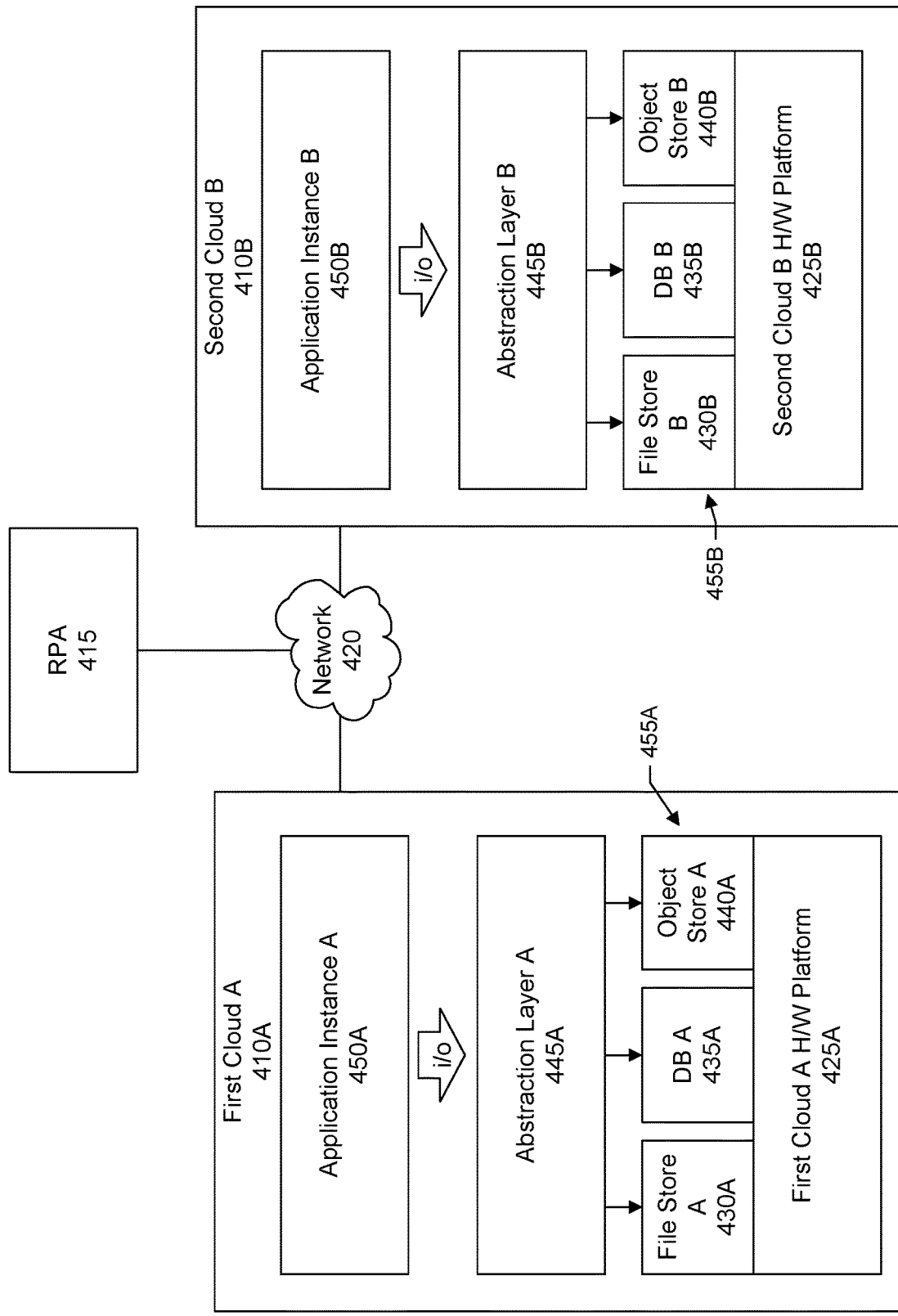
FIG. 4 shows a more detailed block diagram of an active-active cloud computing configuration according to a specific embodiment.

FIG. 4 shows a more detailed block diagram of a distributed network environment having an active-active cloud computing architecture 405 according to a specific embodiment. In the example shown in FIG. 4, there is a first cloud A 410A, a second cloud B 410B, and an RPA 415, each of which are interconnected by a network 420. While the RPA is shown in FIG. 4 as being separate from first and second clouds A, B, it should be appreciated that this is for purposes of illustration. The RPA may be included with first cloud A, included with second cloud B, or may be separate from first and second clouds A, B.

The network may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server. The network is representative of many different environments including a LAN (local area network) system, a wide area network (WAN) system, an Internet system, Ethernet, computer network, intranet, cellular phone network, or other.

The clouds may be geographically separate from each other and connected via the Internet. For example, first cloud A may be located in San Francisco while second cloud B may be located in San Jose. The first and second clouds may be owned by the same or different cloud service providers. First and second clouds A, B include physical hardware platforms or infrastructures 425A, B, respectively, that support the various endpoints, application programs, application instances, services, storage services, storage types, backup services, data protection services, processes, and so forth.

A cloud platform may include a server system. The servers can be general purpose computers with software and hardware. The hardware may include a processor, memory, storage (e.g., hard disk), input/output (I/O) controller, network interface, display or electronic screen, input device, and other computing components, each of which may be interconnected by a bus architecture or any interconnection scheme. The software may include an operating system, application programs, services, daemons, drivers, file system device drivers, file system libraries, code modules, and other software components. Examples of operating systems include the Microsoft Windows® family of operating systems (e.g., Windows Server), Linux, HP-UX, UNIX, Sun OS, Solaris, Mac OS X (e.g., Macintosh), Alpha OS, AIX, IRIX32, or IRIX64. Other operating systems may be used. Communications among the components may be via a communication protocol interface or application program interface (API) or messaging system.

The growth in cloud computing has been accompanied by a growth in many different types of storage or storage services that are available. In the example shown in FIG. 4, first cloud A includes a file store 430A, database 435A, and object store 440A. Second cloud B includes a corresponding file store 430B, database 435B, and object store 440B. A file store stores data in a hierarchy of files and folders and can include network attached storage (NAS). A file store may be accessed through protocols such as Common Internet File System (CIFS), Network File System (NFS), or Server Message Block (SMB). As another example, block storage may be accessed through iSCSI, Fibre Channel or Fibre Channel over Ethernet. A block is a chunk of data and one or more blocks may be combined to create a file. A block has an address and an application may access a block by making a SCSI call to that address.

As another example, object storage is a storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. Instead of organizing files in a directory hierarchy, object storage systems store files in a flat organization of containers.

A database is generally used for storing related, structured data, with well-defined data formats, in an efficient manner for insert, update, or retrieval. A database can provide for a higher level of isolated transactions, recovery, integrity, and security as compared to, for example, a file system which provides looser guarantees regarding consistency, isolation and durability.

Each storage type or service has its own advantages. In particular, file storage is generally considered less expensive than, for example, database storage or block storage and is relatively less complex to implement and manage. Object storage is generally considered more scalable than file system storage. Object storage systems require less metadata than file systems to store and access files. They are typically more efficient because they reduce the overhead of managing file metadata since the metadata may be stored with the object. Object storage can be desirable when storing unstructured or archival data. This may include storage of media such as photos, songs, sound, video, Web content, documents, and so forth. Databases can be desirable when there is a need to store transactional data, provide multi-user access, and place constraints on the data stored. For example, a database may be used to store customer contact information and enforce that only numbers are in the phone number field and to reliably track customer orders.

Providing an active-active configuration in a cloud-based system is challenging because of the many different types of cloud storage choices that are available. For example, attempting to replicate a file to be stored in a file system at one cloud to a database at another cloud may result in errors and other problems because of the differences in the way file systems and databases store and organize data.

In a specific embodiment, an abstraction layer is provided between an instance of an application and a set of different storage types or services. The abstraction layer decouples the instance of the application from the storage services. The abstraction layer and RPA provide a bridge for replicating between storage of a particular type at one cloud and storage corresponding to the particular type at another cloud. In the example shown in FIG. 4, first cloud A includes a first abstraction layer A 445A between a first instance A of an application 450A and a first set of different storage types or services 455A (e.g., file store A, database A, and object store A). Similarly, second cloud B includes a second abstraction layer B 445B between a second instance B of the application 450B and a second set of different storage types or services 455B (e.g., file store B, database B, and object store B). In other words, there can be two simultaneous instances of the application that are performing reads and writes to the storage. The storage services may be referred to as a storage layer or data storage capabilities.

As shown in the example of FIG. 4, there are three layers including the application, abstraction, and storage layers. These layers can be hierarchical where there are higher and lower level layers compared to other layers. The application instance layer is above the abstraction layer and storage services layer. The abstraction layer is above the storage services layer. Lower layers generally contain more specific and more physically-related information compared to a higher layer.

In this specific embodiment, the abstraction layer is responsible for intercepting all I/Os or write commands or transactions from an application instance before the write commands are received by the storage layer. The abstraction layer may be implemented as a driver or any kind of agent or module in a data path between the application instance and storage. The RPA connects to each abstraction layer. The abstraction layer replicates or sends the write command to the RPA. The RPA then coordinates between the abstraction layers in order to maintain consistency or replicate between storage of a particular type at one cloud and corresponding storage at another cloud, thereby providing an active-active cloud configuration. The RPA helps to manage writes by first and second clouds A, B to the same or corresponding data objects.

An abstraction layer may include code or logic that intercepts calls from an instance of the application to the different storage services. For example, an object stored in the object store may be accessed using an HTTP-based REST application programming interface (API), a file stored in the file system may be accessed using an NFS call, and so forth. In a specific embodiment, the abstraction layer includes a Java service or component that intercepts any number of different write commands (e.g., intercepts HTTP PUT request, iSCSI calls, and so forth), sends the write to the RPA, and when appropriate writes to the proper storage component. In other words, because of the abstraction layer an application will not connect directly to a particular data service. Rather the application connects to the abstraction layer that is above the data services.

In a specific embodiment, a first abstraction layer at a first cloud intercepts a first call to a first data service (e.g., database) available at the first cloud, sends a copy of the first call to an RPA, intercepts a second call to a second data service (e.g., file store) available at the first cloud, different from the first data service, and sends a copy of the second call to the RPA. In this specific embodiment, there is a second abstraction layer at a second cloud, the second and first clouds being in an active-active configuration. The second abstraction layer intercepts a third call to a third data service (e.g., database) available at the second cloud, sends a copy of the third call to the RPA, intercepts a fourth call to a fourth data service (e.g., file store) available at the second cloud, different from the third data service, and sends a copy of the fourth call to the RPA.

Figure 5:
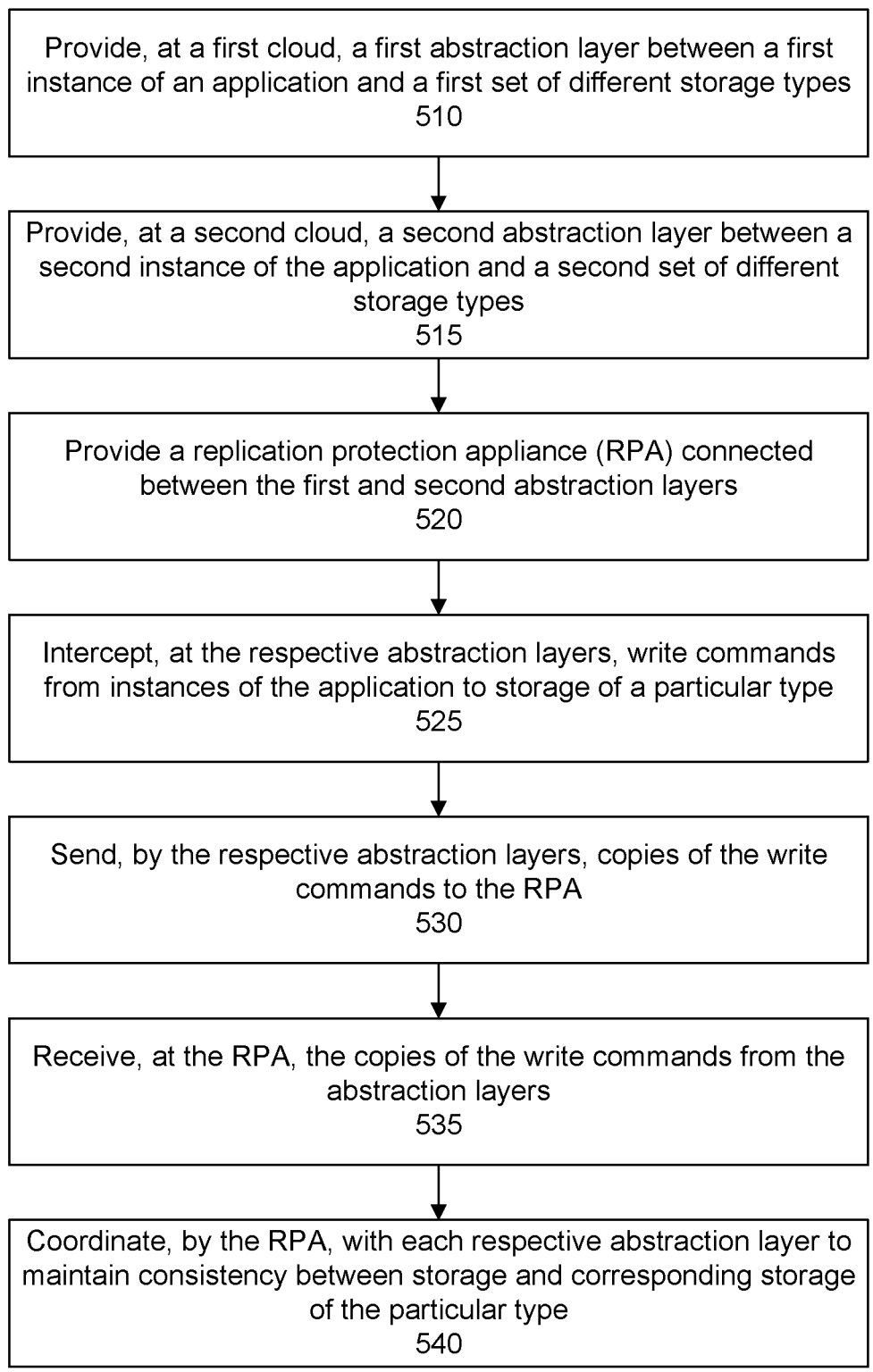
FIG. 5 shows an overall flow of a process for maintaining an active-active cloud computing configuration according to an embodiment.

FIG. 5 shows an overall flow of a process of an active-active cloud according to a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a first abstraction layer is provided at a first cloud (e.g., cloud A). The first abstraction layer is located between a first instance of an application and a first set of different storage types available at the first cloud. In a step 515, a second abstraction layer is provided at a second cloud (e.g., cloud B), remote from first cloud A. The second abstraction layer is located between a second instance of the application and a corresponding second set of different storage types available at the second cloud. In a step 520, a replication protection appliance (RPA) is provided. The RPA is connects to the first and second abstraction layers.

In a step 525, the respective abstraction layers intercept write commands from instances of the application to storage of a particular type before the write is received by the storage. In a step 530, an abstraction layer (e.g., source abstraction layer) sends a copy of the write command to the RPA. In a step 535, the RPA receives the write command from the abstraction layer. In a step 540, the RPA coordinates with the source abstraction layer at the source cloud (e.g., source of the write command) and the other abstraction layer at the other cloud (e.g., target cloud) to maintain consistency between the storage and corresponding storage of the particular type at the different clouds.

As discussed above, the RPA provides for synchronous writes and asynchronous writes. In a specific embodiment, for a synchronous write, an abstraction layer sends an intercepted write command to the RPA. The abstraction layer waits for receipt of an acknowledgement from the RPA that the write has been acknowledged by the other abstraction layer before passing the write to the appropriate storage component.

Figure 6:
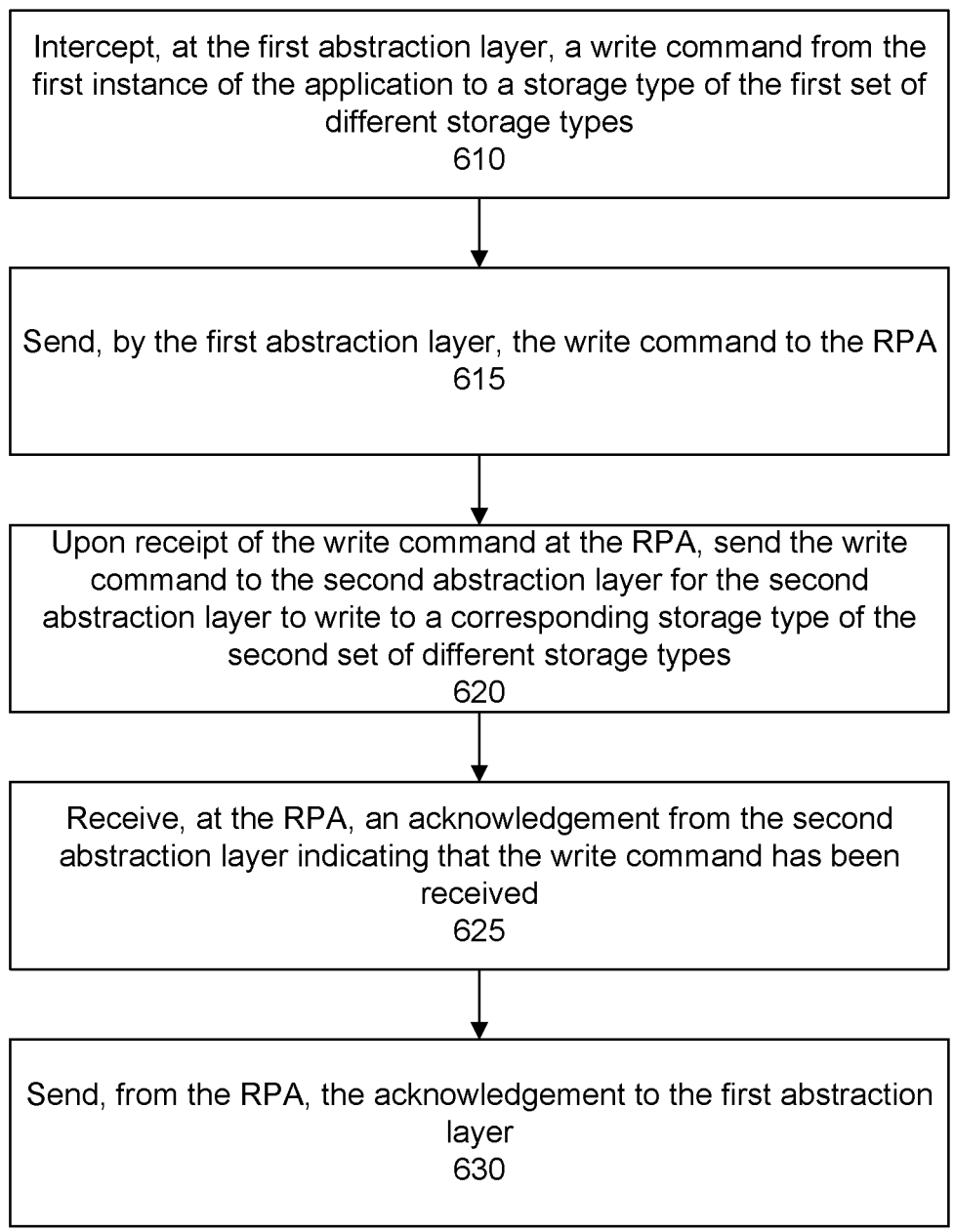
FIG. 6 shows a flow for a synchronous write mode according to an embodiment.

More particularly, FIG. 6 shows a flow of a process for a synchronous write mode. In a step 610, the first abstraction layer at first cloud A intercepts a write command from a first instance of the application to storage of a particular storage type of the first set of different storage types. In a step 615, the abstraction layer sends a copy of the write command to the RPA. In a step 620, upon receipt of the write command at the RPA, the RPA sends the write command to the second abstraction layer at second cloud B for the second abstraction layer to write to storage corresponding to the particular storage type.

In a step 625, the RPA receives from the second abstraction layer at second cloud B an acknowledgement indicating that the second abstraction layer received the write command. In a step 630, the RPA sends an acknowledgement to the first abstraction layer at first cloud A. Upon receipt of the acknowledgement, the first abstraction layer may then proceed with the write to storage of the particular type.

Figure 7:
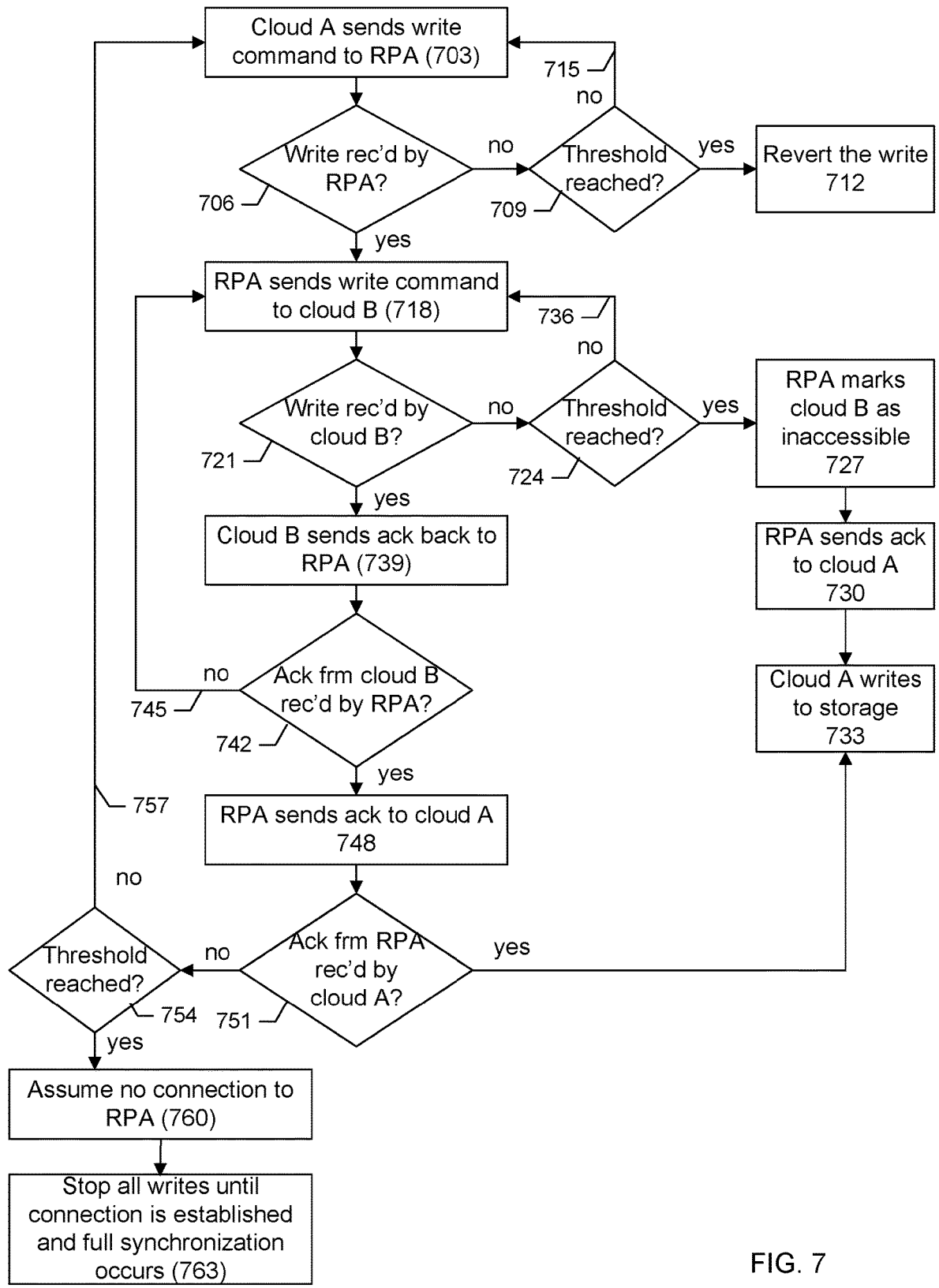
FIG. 7 shows a flow for handling errors during a synchronous write mode according to an embodiment.

FIG. 7 shows a flow of a process for handling errors during a synchronous write. Errors may occur because of lost connectivity between first cloud A and the RPA, between second cloud B and the RPA, or other issues. In a step 703, first cloud A (or, more particularly, first abstraction layer A at first cloud A) sends an intercepted write command to the RPA. In a step 706, a determination is made as to whether the write sent by first cloud A was received by the RPA. If the RPA does not respond to first cloud A with an acknowledgment of receipt of the write command, first cloud A (or first abstraction layer A), may determine that the RPA did not receive the write command.

If so, in a step 709, first cloud A determines whether a threshold has been reached. The threshold may be a threshold number of times first cloud A should attempt to send the write command to the RPA. For example, the first abstraction layer may maintain a counter variable that tracks the number of times or attempts to send the write command to the RPA. First abstraction layer A can compare the counter variable to the threshold to determine whether the threshold has been reached. The threshold may instead be a threshold duration that first cloud A should wait before determining that the RPA did not receive the write command. The threshold can be configurable such as by a user or administrator. If the threshold has been reached, in a step 712, the first abstraction layer reverts the write. If the threshold has not been reached, the process loops back 715 for first abstraction layer A to resend the write command to the RPA.

Alternatively, if the write command from first cloud A (or first abstraction layer A) has been received by the RPA, in a step 718, the RPA sends the write command to second cloud B (or second abstraction layer B). In a step 721, a determination is made as to whether the write sent by the RPA was received by second cloud B. If second cloud B does not respond to the RPA with an acknowledgement of receipt, the RPA may determine that second cloud B did not receive the write command.

If so, in a step 724, the RPA determines whether a threshold has been reached. The threshold may likewise be a threshold number of times the RPA should attempt to send the write command to second cloud B. For example, the RPA may maintain a counter variable that tracks the number of times or attempts to send the write command to second cloud B. The RPA can compare the counter variable to the threshold to determine whether the threshold has been reached. The threshold may instead be a threshold duration that the RPA should wait before determining that second cloud B did not receive the write command. The threshold can be configurable such as by a user or administrator.

If the threshold has been reached, in a step 727, the RPA marks second cloud B as inaccessible. In a step 730, the RPA sends an acknowledgment to first cloud A. In a step 733, upon receipt of the acknowledgment first cloud A writes to storage. Thus, in some embodiments, writes may continue at one of the clouds even if the other cloud is inaccessible. This helps to reduce the amount of disruption. Alternatively, the system may be configured so that writes are stopped if one or more of the cloud are inaccessible.

If the threshold has not been reached, the process loops back 736 for the RPA to resend the write command to second cloud B.

In a step 739, if second cloud B receives the write command from the RPA, second cloud B sends an acknowledgement to the RPA.

In a step 742, the RPA determines whether an acknowledgment has been received from second cloud B. If the RPA did not receive the acknowledgment from second cloud B, the process loops back 745 for the RPA to resend the write command to second cloud B.

If, however, the RPA receives the acknowledgment from second cloud B, in a step 748, the RPA sends an acknowledgment to first cloud A. In a step 751, a determination is made as to whether the acknowledgment from the RPA was received by first cloud A.

If first cloud A did in fact receive the acknowledgment from the RPA, cloud A (or first abstraction layer A) may then write to storage (step 733).

Alternatively, if first cloud A did not receive the acknowledgment from the RPA, in a step 754, first cloud A (or first abstraction layer A) determines whether a threshold has been reached. The threshold may likewise be a threshold number of times first cloud A should attempt to send the write command to the RPA. For example, first cloud A (or first abstraction layer A) may maintain a counter variable that tracks the number of times or attempts to send the write command to the RPA. First cloud A (or first abstraction layer A) can compare the counter variable to the threshold to determine whether the threshold has been reached. The threshold may instead be a threshold duration that first cloud A should wait before determining that there is no connection to the RPA. The threshold can be configurable such as by a user or administrator.

If the threshold has not been reached, the process loops back 757 for first cloud A to resend the write command to the RPA. Alternatively, if the threshold has been reached, in a step 760, first cloud A (or first abstraction layer A) assumes that there is no connectivity to the RPA. In a step 763, all writes are then stopped until a connection can be established and full synchronization occurs.

Figure 8:
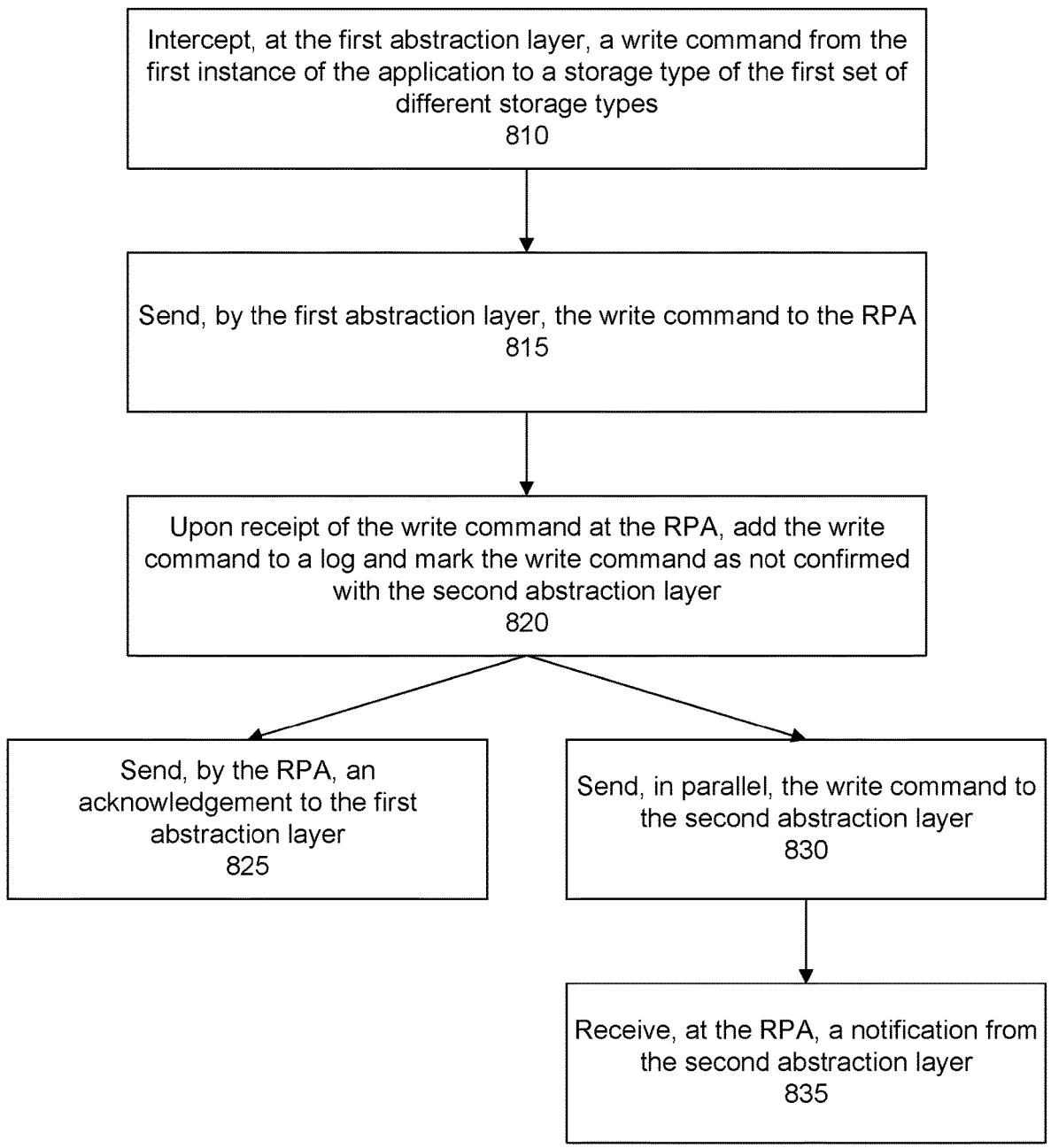
FIG. 8 shows a flow for an asynchronous write mode according to an embodiment.

FIG. 8 shows a flow of a process for an asynchronous write mode. In a specific embodiment, for an asynchronous write, the RPA sends an acknowledgement to an abstraction layer upon receipt of a write command intercepted by the abstraction layer before the RPA receives an acknowledgement of the write command back from another abstraction layer. More particularly, in a step 810, the first abstraction layer at first cloud A intercepts a write command from a first instance of the application to storage of a particular storage type of the first set of different storage types.

In a step 815, first cloud A (or first abstraction layer A) sends the write command to the RPA. In a step 820, the RPA upon receipt of the write command at the RPA adds the write command to a log and marks the write command as not confirmed with second cloud B (or second abstraction layer B).

In a step 825, the RPA sends an acknowledgment to first cloud A (or first abstraction layer A). In a step 830, the RPA, concurrently or in parallel with the sending of the acknowledgment to first cloud A (step 825), sends the write command to second cloud B (or second abstraction layer B). In a step 835, the RPA receives a notification from second cloud B (or second abstraction layer B).

Figure 9:
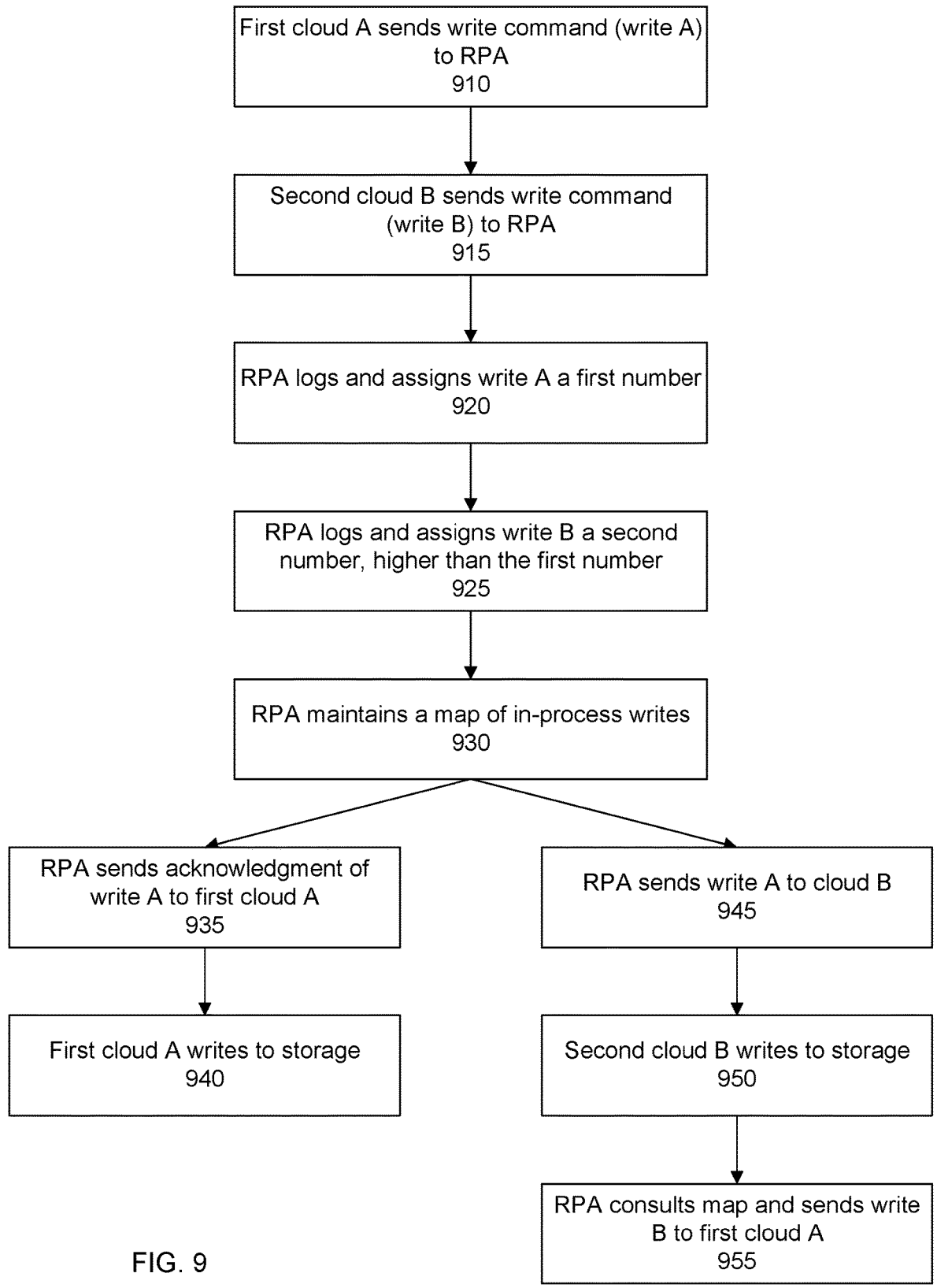
FIG. 9 shows a flow for handling multiple writes during an asynchronous write mode according to an embodiment.

FIG. 9 shows a flow of a process for handling a scenario in which second cloud B sends a write after first cloud A sends a write. In a step 910, first cloud A (or first abstraction layer A) sends a write command (e.g., write A) to the RPA. In a step 915, after first cloud A sends write A, second cloud B (or second abstraction layer B) sends another write command (write B) to the RPA.

In a step 920, the RPA logs and assigns write A a first number. In a step 925, the RPA logs and assigns write B a second number, higher than the first number, since write B was after write A. In other words, the writes may be assigned numbers sequentially or based on the order in which the write commands were received by the RPA. The RPA can maintain a map of in-process writes (step 930) occurring for the same data set. FIG. 10 shows an example of a map 1005 that may be maintained and stored by the RPA. In the example, shown in FIG. 10, the map includes first, second, third, and fourth columns 1010A-D, respectively. The first column stores a number of the write as assigned by the RPA. The second column stores a copy of the write command. The third column identifies the storage type associated with the write. The fourth column identifies the data set that the write is to be applied to.

The sample data shown in the map indicates that "write A" numbered "1" is to be applied to the file "marketingplan.doc" that is stored in a file store. Then, after "write A" is applied, "write B" numbered "2" is to be applied to the file. A "write AA" numbered "3" is to be applied to an object having "objectID_x" in an object store. Then, after "write AA" is applied, a "write BB" numbered "4" is to be applied to the object. The numbering of the writes allows the RPA to apply the writes sequentially or in the correct order and maintain an active-active cloud configuration.

Referring back now to FIG. 9, in a step 935, the RPA sends an acknowledgment of "write A" to first cloud A (or first abstraction layer A). In a step 940, first cloud A (or first abstraction layer A) upon receiving the acknowledgement from the RPA then writes to the storage component indicated in the write.

The RPA, in a step 945, sends in parallel with the sending of the acknowledgment to first cloud A (step 935), "write A" to second cloud B (or second abstraction layer B). In a step 950, second cloud B (or second abstraction layer B) then writes to the corresponding storage component indicated in the write. Once second cloud B has acknowledged "write A" to the RPA, in a step 955, the RPA consults the map for the next ordered write, e.g., "write B" and sends the write command to first cloud A.

It should be appreciated that in the active-active model, writes can come from both instances. For example, in an embodiment, a method includes intercepting, at the second abstraction layer, a second write command from the second instance of the application to storage of the particular type among the second set of different storage types; sending, by the second abstraction layer, a copy of the second write command to the RPA, where the RPA replicates the second write command to the first abstraction layer for the first abstraction layer to send to corresponding storage of the particular type among the first plurality of different storage types.

In a specific embodiment, a method for maintaining an active-active cloud computing environment includes: providing, at a first cloud computer system, a first abstraction layer between a first instance of an application and a first plurality of different storage types; providing, at a second cloud computer system, remote from the first cloud, a second abstraction layer between a second instance of the application and a second plurality of different storage types, the first and second clouds being connected by a network; providing a replication protection appliance (RPA), coupled between the first and second abstraction layers; intercepting, at the first abstraction layer, a write command from the first instance of the application to storage of a particular type among the first plurality of different storage types; and sending, by the first abstraction layer, a copy of the write command to the RPA, wherein the RPA replicates the write command to the second abstraction layer for the second abstraction layer to send to corresponding storage of the particular type among the second plurality of different storage types.

The first plurality of different storage types may include a first file store, a first database, and a first object store, the second plurality of different storage types may include a second file store, a second database, and a second object store, and the RPA may maintain data consistency between the first and second file stores, the first and second databases, and the first and second object stores.

The method may include managing, by the RPA, writes intercepted by the first and second abstraction layers synchronously. The method may include managing, by the RPA, writes intercepted by the first and second abstraction layers asynchronously.

In an embodiment, the write command is a first write command for a first storage type of the first plurality of different storage types, and the method includes: intercepting, at the first abstraction layer, a second write command from the first instance of the application to a second storage type of the first plurality of different storage types, the second storage type being different from the first storage type.

In another specific embodiment, there is a system for maintaining an active-active cloud computing environment, the system including: a processor-based system executed on a computer system and configured to: provide, at a first cloud computer system, a first abstraction layer between a first instance of an application and a first plurality of different storage types; provide, at a second cloud computer system, remote from the first cloud, a second abstraction layer between a second instance of the application and a second plurality of different storage types, the first and second clouds being connected by a network; provide a replication protection appliance (RPA), coupled between the first and second abstraction layers; intercept, at the first abstraction layer, a write command from the first instance of the application to storage of a particular type among the first plurality of different storage types; and send, by the first abstraction layer, a copy of the write command to the RPA, wherein the RPA replicates the write command to the second abstraction layer for the second abstraction layer to send to corresponding storage of the particular type among the second plurality of different storage types.

In another specific embodiment, there is a computer program product, including a non-transitory computer-readable medium having a computer-readable program code embodied therein, the computer-readable program code adapted to be executed by one or more processors to implement a method including providing, at a first cloud computer system, a first abstraction layer between a first instance of an application and a first plurality of different storage types; providing, at a second cloud computer system, remote from the first cloud, a second abstraction layer between a second instance of the application and a second plurality of different storage types, the first and second clouds being connected by a network; providing a replication protection appliance (RPA), coupled between the first and second abstraction layers; intercepting, at the first abstraction layer, a write command from the first instance of the application to storage of a particular type among the first plurality of different storage types; and sending, by the first abstraction layer, a copy of the write command to the RPA, wherein the RPA replicates the write command to the second abstraction layer for the second abstraction layer to send to corresponding storage of the particular type among the second plurality of different storage types.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for maintaining an active-active cloud computing environment comprising:

providing, at a first cloud computer system of a first cloud provider, a first abstraction layer, the first abstraction layer being between a first instance of an application at the first cloud and a first plurality of different storage types, the first plurality of different storage types being made available as storage services to customer tenants of the first cloud provider;

providing, at a second cloud computer system of a second cloud provider, different from the first cloud provider, and, remote from the first cloud, a second abstraction layer, the second abstraction layer being between a second instance of the same application at the second cloud and a second plurality of different storage types, the first and second clouds being connected by a network, the second plurality of different storage types being made available as storage services to customer tenants of the second cloud provider;

providing a replication protection appliance (RPA), coupled between the first and second abstraction layers, and comprising a synchronous write mode;

intercepting, at the first abstraction layer, a write command from the first instance of the application to storage of a particular type among the first plurality of different storage types; and sending, by the first abstraction layer, a copy of the write command to the RPA, wherein the RPA replicates the write command to the second abstraction layer for the second abstraction layer to send to corresponding storage of the same particular type among the second plurality of different storage types, wherein the synchronous write mode comprises:

waiting, by the first abstraction layer, for an acknowledgement from the RPA that the write command was received by the second abstraction layer before passing the write command to the storage of the particular type at the first cloud;

receiving, at the RPA, an acknowledgment from the second abstraction layer indicating that the write command was received by the second abstraction layer; and after receipt of the acknowledgement from the second abstraction layer, sending, by the RPA, the acknowledgement to the first abstraction layer indicating that the write command was received by the second abstraction layer, thereby allowing the first abstraction layer to pass the write command to the storage of the particular type at the first cloud.

2. The method of claim 1 wherein the first plurality of different storage types comprises a first file store, a first database, and a first object store, the second plurality of different storage types comprises a second file store, a second database, and a second object store, and wherein the RPA maintains data consistency between the first and second file stores, the first and second databases, and the first and second object stores.

3. The method of claim 1 wherein the RPA comprises an asynchronous write mode, wherein the asynchronous write mode comprises:

upon receiving the copy of the write command from the first abstraction layer, sending, by the RPA, an acknowledgement to first abstraction layer, thereby allowing the first abstraction layer to pass the write command to the storage of the particular type before receiving an acknowledgement from the second abstraction layer that the write command was received.

4. The method of claim 1 wherein the write command is a first write command for a first storage type of the first plurality of different storage types, and the method comprises:

intercepting, at the first abstraction layer, a second write command from the first instance of the application to a second storage type of the first plurality of different storage types, the second storage type being different from the first storage type.

5. The method of claim 1 comprising:

intercepting, at the second abstraction layer, a second write command from the second instance of the application to storage of the particular type among the second plurality of different storage types; and sending, by the second abstraction layer, a copy of the second write command to the RPA, wherein the RPA replicates the second write command to the first abstraction layer for the first abstraction layer to send to corresponding storage of the particular type among the first plurality of different storage types.

6. The method of claim 1 wherein the first plurality of different storage types comprises a particular type of file store, a particular type of database, and a particular type of object store, wherein the second plurality of different storage types comprises the same particular type of file store, the same particular type of database, and the same particular type of object store, wherein when a first write command to a first file store of the particular type of file store is intercepted at the first abstraction layer, a copy of the first write command is sent by the first abstraction layer to the RPA to be replicated and sent by the second abstraction layer to a second file store of the same particular type of file store, wherein when a second write command to a first database of the particular type of database is intercepted at the first abstraction layer, a copy of the second write command is sent by the first abstraction layer to the RPA to be replicated and sent by the second abstraction layer to a second database of the same particular type of database, and wherein when a third write command to a first object store of the particular type of object store is intercepted at the first abstraction layer, a copy of the third write command is sent by the first abstraction layer to the RPA to be replicated and sent by the second abstraction layer to a second object store of the same particular type of object store.

7. A system for maintaining an active-active cloud computing environment, the system comprising:

a processor-based system executed on a computer system and configured to:

provide, at a first cloud computer system of a first cloud provider, a first abstraction layer, the first abstraction layer being between a first instance of an application at the first cloud and a first plurality of different storage types, the first plurality of different storage types being made available as storage services to customer tenants of the first cloud provider;

provide, at a second cloud computer system of a second cloud provider, different from the first cloud provider, and, remote from the first cloud, a second abstraction layer, the second abstraction layer being between a second instance of the same application at the second cloud and a second plurality of different storage types, the first and second clouds being connected by a network, the second plurality of different storage types being made available as storage services to customer tenants of the second cloud provider;

provide a replication protection appliance (RPA), coupled between the first and second abstraction layers, and comprising an asynchronous write mode;

intercept, at the first abstraction layer, a write command from the first instance of the application to storage of a particular type among the first plurality of different storage types; and send, by the first abstraction layer, a copy of the write command to the RPA, wherein the RPA replicates the write command to the second abstraction layer for the second abstraction layer to send to corresponding storage of the same particular type among the second plurality of different storage types, wherein the first plurality of different storage types comprises a particular type of file store, a particular type of database, and a particular type of object store, wherein the second plurality of different storage types comprises the same particular type of file store, the same particular type of database, and the same particular type of object store, wherein when a first write command to a first file store of the particular type of file store is intercepted at the first abstraction layer, a copy of the first write command is sent by the first abstraction layer to the RPA to be replicated and sent by the second abstraction layer to a second file store of the same particular type of file store, wherein when a second write command to a first database of the particular type of database is intercepted at the first abstraction layer, a copy of the second write command is sent by the first abstraction layer to the RPA to be replicated and sent by the second abstraction layer to a second database of the same particular type of database, and wherein when a third write command to a first object store of the particular type of object store is intercepted at the first abstraction layer, a copy of the third write command is sent by the first abstraction layer to the RPA to be replicated and sent by the second abstraction layer to a second object store of the same particular type of object store, and wherein in the asynchronous write mode, the RPA sends an acknowledgment of the write command to the first abstraction layer upon receipt of the copy of the write command from the first abstraction layer, thereby allowing the first abstraction layer to pass the write command to the storage of the particular type at the first cloud before receiving an acknowledgement from the second abstraction layer at the second cloud that the write command was received.

8. The system of claim 7 wherein the RPA comprises a synchronous write mode, wherein in the synchronous write mode, the first abstraction layer waits for an acknowledgement from the RPA that the write command was received by the second abstraction layer before passing the write command to the storage of the particular type at the first cloud, the RPA receives an acknowledgement from the second abstraction layer indicating that the write command was received by the second abstraction layer, and after receipt of the acknowledgement from the second abstraction layer, the RPA sends the acknowledgement to the first abstraction layer indicating that the write command was received by the second abstraction layer, thereby allowing the first abstraction layer to pass write command to the storage of the particular type at the first cloud.

9. The system of claim 7 wherein the write command is a fourth write command for a first storage type of the first plurality of different storage types, and the processor-based system is configured to:

intercept, at the first abstraction layer, a fifth write command from the first instance of the application to a second storage type of the first plurality of different storage types, the second storage type being different from the first storage type.

10. The system of claim 7 wherein the processor-based system is configured to:

intercept, at the second abstraction layer, a fourth write command from the second instance of the application to storage of the particular type among the second plurality of different storage types; and send, by the second abstraction layer, a copy of the fourth write command to the RPA, wherein the RPA replicates the fourth write command to the first abstraction layer for the first abstraction layer to send to corresponding storage of the particular type among the first plurality of different storage types.

11. A computer program product, comprising a non-transitory computer-readable medium having a computer-readable program code embodied therein, the computer-readable program code adapted to be executed by one or more processors to implement a method comprising:

providing, at a first cloud computer system of a first cloud provider, a first abstraction layer, the first abstraction layer being between a first instance of an application at the first cloud and a first plurality of different storage types, the first plurality of different storage types being made available as storage services to customer tenants of the first cloud provider;

providing, at a second cloud computer system of a second cloud provider, different from the first cloud provider, and, remote from the first cloud, a second abstraction layer, the second abstraction layer being between a second instance of the same application at the second cloud and a second plurality of different storage types, the first and second clouds being connected by a network, the second plurality of different storage types being made available as storage services to customer tenants of the second cloud provider;

providing a replication protection appliance (RPA), coupled between the first and second abstraction layers, and comprising a synchronous write mode, and an asynchronous write mode;

intercepting, at the first abstraction layer, a write command from the first instance of the application to storage of a particular type among the first plurality of different storage types; and sending, by the first abstraction layer, a copy of the write command to the RPA, wherein the RPA replicates the write command to the second abstraction layer for the second abstraction layer to send to corresponding storage of the same particular type among the second plurality of different storage types, wherein the first plurality of different storage types comprises a particular type of database, wherein the second plurality of different storage types comprises the same particular type of database, and wherein when a first write command to a first database of the particular type of database is intercepted at the first abstraction layer, a copy of the first write command is sent to the RPA to be replicated to the second abstraction layer and sent by the second abstraction layer to a second database of the same particular type of database, wherein the synchronous write mode comprises:

waiting, by the first abstraction layer, for an acknowledgement from the RPA that the write command was received by the second abstraction layer before passing the write command to the storage of the particular type at the first cloud, receiving, at the RPA, an acknowledgement from the second abstraction layer indicating that the write command was received by the second abstraction layer, and after receipt of the acknowledgement from the second acknowledgement layer, sending, by the RPA, the acknowledgement to the first abstraction layer indicating that the write command was received by the second abstraction layer, thereby allowing the first abstraction layer to pass the write command to the storage of the particular type at the first cloud, and wherein the asynchronous write mode comprises:

upon receiving the copy of the write command from the first abstraction layer, sending, by the RPA, an acknowledgement to the first abstraction layer, thereby allowing the first abstraction layer to pass the write command to the storage of the particular type at the first cloud before receiving an acknowledgment from the second abstraction layer that the write command was received.

12. The computer program product of claim 11 wherein the first plurality of different storage types comprises a first file store, the first database, and a first object store,
the second plurality of different storage types comprises a second file store, the second database, and a second object store, and
wherein the RPA maintains data consistency between the first and second file stores, the first and second databases, and the first and second object stores.

13. The computer program product of claim 11 wherein the write command is a second write command for a first storage type of the first plurality of different storage types, and the method comprises:

intercepting, at the first abstraction layer, a third write command from the first instance of the application to a second storage type of the first plurality of different storage types, the second storage type being different from the first storage type.

14. The computer program product of claim 11 wherein the method comprises:

intercepting, at the second abstraction layer, a second write command from the second instance of the application to storage of the particular type among the second plurality of different storage types; and sending, by the second abstraction layer, a copy of the second write command to the RPA, wherein the RPA replicates the second write command to the first abstraction layer for the first abstraction layer to send to corresponding storage of the particular type among the first plurality of different storage types.

* * * * *